(«12») United States Patent
Koehler et al.

(10) Patent No.: US 8,754,761 B2
(45) Date of Patent: Jun. 17, 2014

(54) CONTROL UNIT AND METHOD FOR AUTOMATICALLY GUIDING A VEHICLE

(75) Inventors: Markus Koehler, Ludwigsburg (DE);
Michael Scherl, Bietigheim (DE);
Matthias Haug, Pleidelsheim (DE);
Uwe Zimmermann, Remseck (DE)

(73) Assignee: Robert Bosch GmbH, Stuttgart (DE)

( * ) Notice: Subject to any disclaimer, the term of this patent is extended or adjusted under 35 U.S.C. 154(b) by 414 days.

(21) Appl. No.: 12/998,485

(22) PCT Filed: Sep. 16, 2009

(86) PCT No.: PCT/EP2009/062007
§ 371 (c)(1),
(2), (4) Date: Jul. 8, 2011

(87) PCT Pub. No.: WO2010/049212
PCT Pub. Date: May 6, 2010

(65) Prior Publication Data
US 2011/0254675 A1 Oct. 20, 2011

(30) Foreign Application Priority Data

Oct. 28, 2008 (DE) .......................... 10 2008 043 220

(51) Int. Cl.
*B60Q 1/00* (2006.01)
*G05D 1/00* (2006.01)

(52) U.S. Cl.
USPC ........... 340/439; 340/435; 340/436; 340/437; 340/438; 701/1; 701/23; 701/25; 701/48

(58) Field of Classification Search
None
See application file for complete search history.

(56) References Cited

U.S. PATENT DOCUMENTS

| | | | |
|---|---|---|---|
| 5,931,252 A | 8/1999 | Shimizu et al. | |
| 6,018,692 A * | 1/2000 | Shimizu et al. | 701/41 |
| 6,275,754 B1 | 8/2001 | Shimizu et al. | |
| 2003/0085810 A1* | 5/2003 | Bullinger et al. | 340/576 |
| 2004/0019426 A1* | 1/2004 | Knoop et al. | 701/301 |

FOREIGN PATENT DOCUMENTS

| | | |
|---|---|---|
| DE | 38 13 083 | 11/1989 |
| DE | 199 22 173 | 11/1999 |
| DE | 103 25 184 | 12/2004 |
| DE | 10 2006 044 803 | 3/2008 |

* cited by examiner

*Primary Examiner* — Benjamin C Lee
*Assistant Examiner* — Rajsheed Black-Childress
(74) *Attorney, Agent, or Firm* — Kenyon & Kenyon LLP

(57) ABSTRACT

A control unit for automatically guiding a vehicle, in particular during a parking procedure, has an interface to a monitoring unit of a brake operating unit of the vehicle to ascertain a braking readiness of the driver in such a way that automatic guiding of the vehicle is interrupted if a braking readiness of a driver is not detected.

15 Claims, 3 Drawing Sheets

CONTROL UNIT AND METHOD FOR AUTOMATICALLY GUIDING A VEHICLE

BACKGROUND OF THE INVENTION

1. Field of the Invention

The present invention relates to a control unit and a method for automatically guiding a vehicle.

2. Description of Related Art

An automatic parking unit for motor vehicles is known from published German patent application document DE 3813083 A1, using which an acceleration unit, a gearshift, and a brake system of a vehicle may be automatically controlled in such a way as to park the vehicle in a parking space in a parallel or perpendicular direction. To control automatic operation, the unit has an operation key panel, in which an appropriate parking operating mode may be selected. Furthermore, control pushbuttons may be provided on the operation key panel, using which an interruption or emergency stop of an automatic parking procedure may be triggered.

BRIEF SUMMARY OF THE INVENTION

The control unit according to the present invention for automatically guiding a vehicle has the advantage over the related art that automatic guiding of a vehicle is interrupted when a braking readiness of a driver is no longer detected. Correspondingly, automatic guiding is performed when or only when a braking readiness of the driver is ascertained. It is thus made possible that automatic guiding of the vehicle is only performed if the driver is in fact ready to brake. Although it may be detected by a monitoring unit in surroundings of a vehicle whether an obstruction is located in a parking path, a relevant obstruction detection unit could be interfered with by an error, for example. Furthermore, the final responsibility for a driving procedure remains with the driver of the vehicle himself. It is ensured according to the present invention that a driver does not blindly rely on the vehicle system, but rather that he always at least signals a braking readiness. Through the detection of the braking readiness and an abort of the parking method for the case in which the driver was not ready to brake at all, a certain minimum alertness and at least a readiness of the driver to intervene in the automatic driving procedure is ensured. In particular, this may prevent the driver from completely relying on an automatic system. For the case in which an intervention by the driver should unexpectedly become necessary, it may therefore be ensured that a driver is not unable to perform an intervention to decelerate the vehicle because of a lack of braking readiness, for example, due to an unfavorable position of the feet in the foot well, although he would perhaps have recognized a danger.

Corresponding advantages also result for a method according to the present invention for automatically guiding a vehicle, in which automatic guiding is interrupted if a braking readiness of a driver is no longer detected.

It is thus advantageous for the case in which a braking readiness of the driver is not detected and automatic guiding of the vehicle is interrupted that the vehicle is additionally automatically decelerated. This may prevent the vehicle from driving quasi-uncontrolled into an obstruction in the event of an abort of automatic guiding of the vehicle.

Furthermore, it is advantageous to detect a braking readiness of the driver when the brake pedal is touched or when at least one foot of the driver is located in a spatial area above the brake pedal, to be able to operate the brake pedal immediately as needed. In this way, it is at least ensured that a driver is physically capable of reacting to possible obstructions within his reaction time and interrupting or aborting the automatic driving.

Furthermore, it is advantageous not to interrupt the automatic guiding as soon as a braking readiness of the driver is not detected for a very short period of time. For example, the fact that a foot of the driver is detected on the brake pedal and the driver releases the brake pedal only slightly, could already result in the automatic driving being interrupted or aborted. However, for an interruption or an abort of the automatic driving, a minimum period of time of an interrupted braking readiness of one second, for example, is advantageously required. An unnecessary interruption or abort of automatic guiding of the vehicle is thus avoided.

Furthermore, it is advantageous to provide an interface to a warning unit, in order to output a warning to a driver if a braking readiness of the driver is not detected. The driver may thus react in such a way that he reestablishes a braking readiness and automatic guiding of the vehicle may be continued, possibly even without an interruption.

The use of a control unit having appropriate monitoring of a braking readiness is advantageous in particular in a parking system for a vehicle. This is because automatic guiding of the vehicle may be implemented particularly well in the case of a parking method, which is generally performed slowly. In addition, automatic guiding is comfortable for a driver during a parking procedure, especially since a parking situation typically places quite high requirements on the evaluation of a driving situation by the driver. However, an embodiment according to the present invention ensures during an automatic performance of a parking method that a driver nonetheless monitors the route of the vehicle and is ready if needed to intervene preferably immediately in automatic guiding of the vehicle.

Furthermore, it is advantageous to check a unit for monitoring a braking readiness of the driver during an initialization of the control unit for automatic guiding of the vehicle, for example. If a malfunction of the unit for monitoring a braking readiness of the driver is detected, a driver at least receives a warning about the fact that monitoring of his braking readiness may not be ensured during a performance of the automatic parking procedure. In one further specific embodiment, it is also possible to completely stop automatic guiding in this case.

Furthermore, it is advantageous to employ monitoring of a braking readiness only after a predefined time period of two seconds, for example, after a beginning of automatic guiding of the vehicle. Depending on a specific embodiment of a parking system for automatic guiding of the vehicle it may, for example, be necessary to start the parking system by operating a gas pedal of the vehicle. In this case, a driver must first be given the possibility of changing his foot from the gas pedal to the brake pedal or in a space above the brake pedal in order to detect a braking readiness. By delaying the beginning of the monitoring of the braking readiness in time, an unnecessary interruption of the automatic parking procedure at the beginning of the parking procedure is avoided.

DETAILED DESCRIPTION OF THE INVENTION

Figure 1:
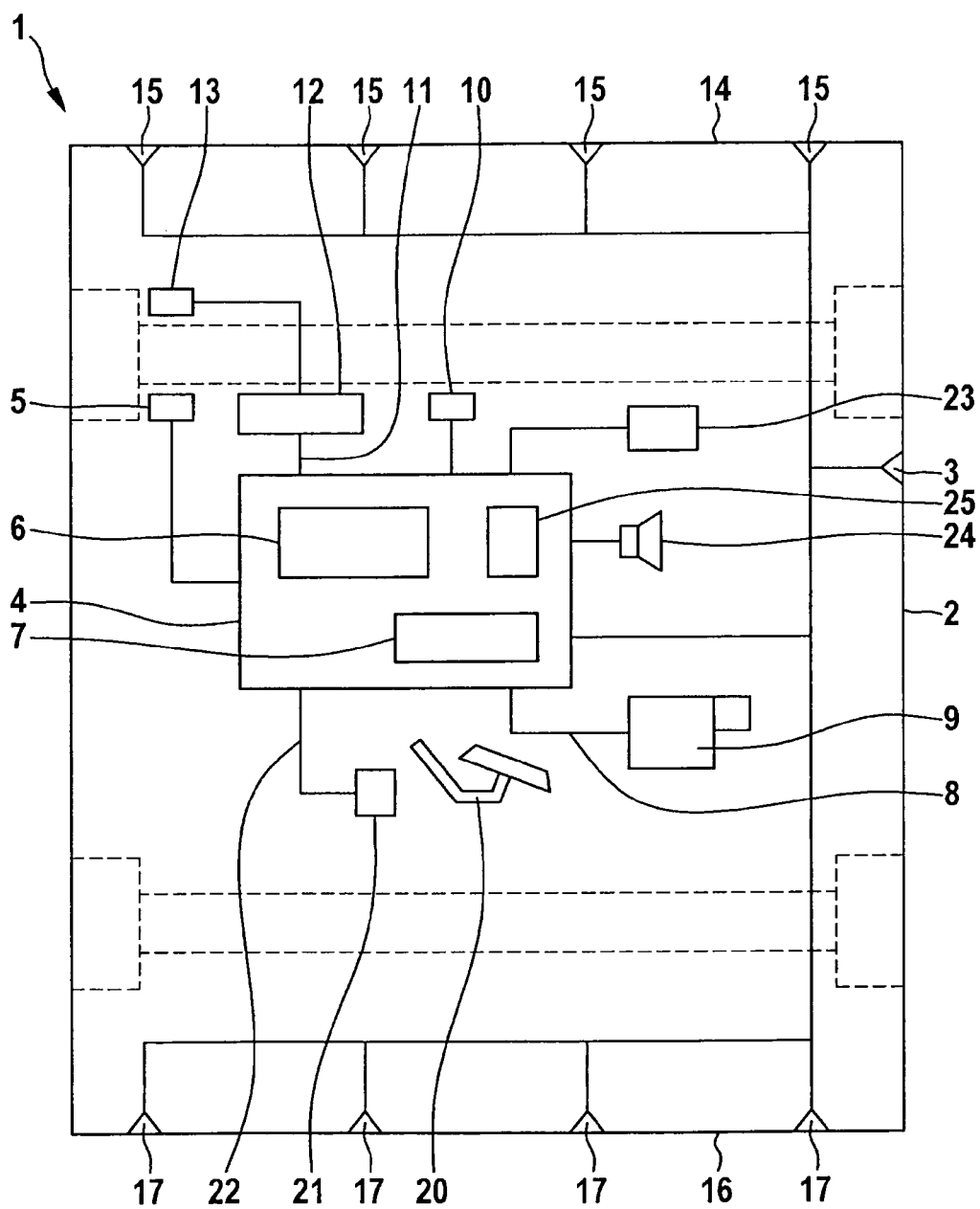
FIG. 1 shows a schematic view of a vehicle having a control unit according to the present invention in a top view.

A vehicle 1 is shown in FIG. 1, in which a distance sensor 3 provided on a right vehicle side 2 measures a distance to lateral obstructions while traveling past them. The measurements are analyzed by a control unit 4 and placed in relation to a traveled route, which is detected via a route sensor 5. Route sensor 5 is implemented as a wheel speed sensor by way of an example. In this way it is possible to detect surroundings of the vehicle on right vehicle side 2. Accordingly, a comparable measurement on the left vehicle side would also be possible.

For the analysis, control unit 4 has a computing unit 6, which determines a parking path of vehicle 1 into a parking space, which is evaluated to be sufficiently large for vehicle 1, based on the current vehicle position. For this purpose, computing unit 6 accesses a memory unit 7 of control unit 4, in which, inter alia, the vehicle dimensions are stored. Control unit 4 is further designed to guide vehicle 1 automatically into the parking space along the pre-calculated parking path. For this purpose, control unit 4 is equipped with an interface 8 to a vehicle drive 9, in order to induce an acceleration of the vehicle. Furthermore, control unit 4 is connected to a steering unit 10, using which vehicle steering may be adjusted. Furthermore, control unit 4 is connected to an interface 11 to a brake control unit 12. Brake control unit 12 is used to activate vehicle brakes 13 in order to decelerate the vehicle if needed.

In order to detect obstructions in the surroundings of the vehicle, furthermore, distance sensors 15 provided on a vehicle front side 14 and distance sensors 17 provided on vehicle rear side 16 are connected to control unit 4, which are implemented correspondingly to distance sensor 3 as ultrasonic sensors, as radar sensors, or as optical sensors, for example. If sensors 15, 17 detect an obstruction in a particular travel direction of the vehicle, computing unit 6 induces a deceleration of vehicle 1 by accessing brake control unit 12.

A brake operating unit, which is implemented as a brake pedal 20, for example, is provided for the deceleration of the vehicle. During the sequence of automatic guiding of the vehicle, automatic guiding may additionally be interrupted by the driver himself at any time by stepping on a brake pedal 20 or also completely aborted in the event of a longer step on brake pedal 20, for example.

During the automatic driving procedure, the vehicle is independently guided by control unit 4. It is generally ensured by the monitoring of the driving path by sensors 15, 17 that the vehicle may not collide with an obstruction. Nonetheless, the driver bears the responsibility for the driving procedure. To ensure that the driver is ready to react to a possible obstruction, a monitoring unit 21 is provided. Monitoring unit 21 is designed to detect whether a driver is ready to step on brake pedal 20. Monitoring unit 21 may detect a touch of brake pedal 20 by the driver, for example. Furthermore, it is also possible to detect a presence of a foot of the driver in a space above brake pedal 20. If a braking readiness of the driver is ascertained in this way, automatic guiding of the vehicle is continued. If a braking readiness of the driver is not detected, automatic guiding of the vehicle is at least interrupted, and also completely aborted if needed, for example, after a continuing lack of detected braking readiness of the driver. Control unit 4 accesses monitoring unit 21 via interface 22 to detect a braking readiness.

In one further specific embodiment, it is also possible that the control unit outputs an acoustic and/or visual warning for the case in which a braking readiness was previously detected and a braking readiness is now no longer detected. For this purpose, the control unit is connected to a display 23 and/or a loudspeaker 24, for example.

In one further specific embodiment, automatic guiding of the vehicle is not immediately interrupted when a lack of braking readiness of the driver is detected, but rather with a time delay. For this purpose, control unit 4 has a time measuring unit 25, using which the time, for which a braking readiness of the driver is not detected, is ascertained. If this ascertained time exceeds a predefined time period of one second, for example, the automatic guiding of the vehicle is interrupted.

Figure 2:
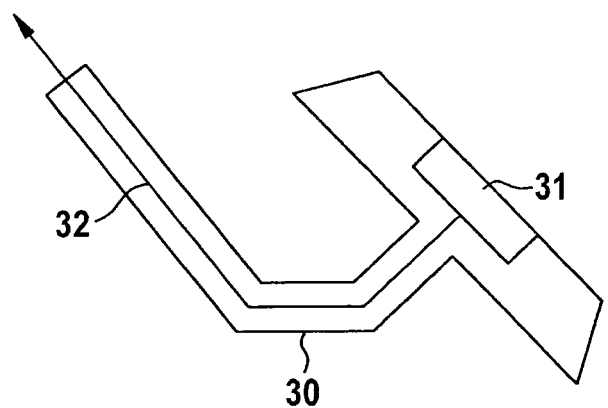
FIGS. 2 and 3 show views of a brake pedal for the performance of the method according to the present invention in various specific embodiments.

A first exemplary embodiment of a detection of a braking readiness of the driver is shown in FIG. 2. A touch sensor 31, which detects a touch of brake pedal 30 by a foot of a driver, is situated in a brake pedal 30. This information is transmitted to control unit 4 via an analysis line 32. Touch sensor 31 may be implemented as an electrical pressure switch, for example, or as a film switch, for example. If brake pedal 30 is touched, a braking readiness of the driver is detected. If brake pedal 30 is not touched, it is detected that there is no braking readiness of the driver. In one further specific embodiment, it is also possible to detect a touch or at least a very close approach of the foot of the driver, which is to be considered equivalent to a touch, to brake pedal 30 via a capacitive proximity sensor.

Figure 3:
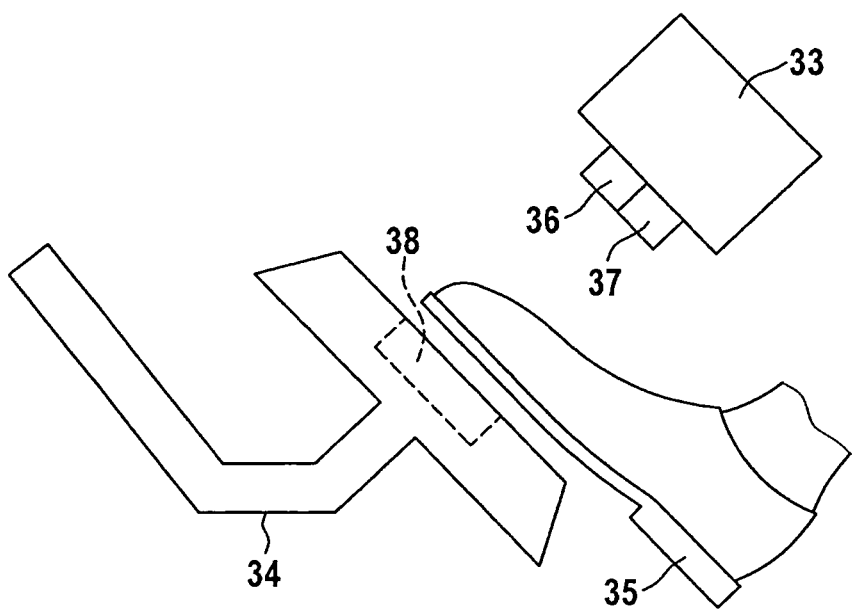

An alternative specific embodiment for a detection of a braking readiness of a driver is shown in FIG. 3. An optical sensor unit 33 observes brake pedal 34. If a foot 35 of a driver is located between optical sensor unit 33 and brake pedal 34, a braking readiness of a driver is detected. If a foot 35 is not detected by optical sensor unit 33 between brake pedal 34 and optical sensor unit 33, it is detected that there is no braking readiness of a driver.

In one first specific embodiment, optical sensor unit 33 may be implemented as a distance measuring sensor unit for this purpose, which operates in an infrared wavelength range, for example. The distance between optical sensor unit 33 and brake pedal 34 is known. If an object is ascertained between optical sensor unit 33 and brake pedal 34, this object is assumed to be a foot of the driver.

In one further specific embodiment, optical sensor unit 33 may also be implemented as a video sensor unit, which records and analyzes an image of brake pedal 34, in order to ascertain the introduction of an object, such as foot 35 of the driver, from a change of the recorded image data and thus to detect a braking readiness of the driver. For this purpose, in one specific embodiment, the optical sensor unit has an infrared lighting unit 36 and a camera unit 37.

In one further specific embodiment it is also possible to use a light barrier unit. For this purpose, optical radiation, preferably in an infrared wavelength range, is emitted in the direction of brake pedal 34 froth a light source 36. An optical receiver unit 38 is in turn situated on brake pedal 34, which receives the optical radiation emitted by transmitting unit 36 only when foot 35 is not located between brake pedal 34 and radiation unit 36. Therefore, if a signal is received, braking readiness of the driver is not detected. The arrangement of the optical transmitting unit and the receiver unit may also be exchanged accordingly.

In further specific embodiments, other detection means for detecting the foot in a spatial area above the brake pedal or on the brake pedal, such as an ultrasonic sensor, may also be used instead of the detection means shown here.

Figure 4:
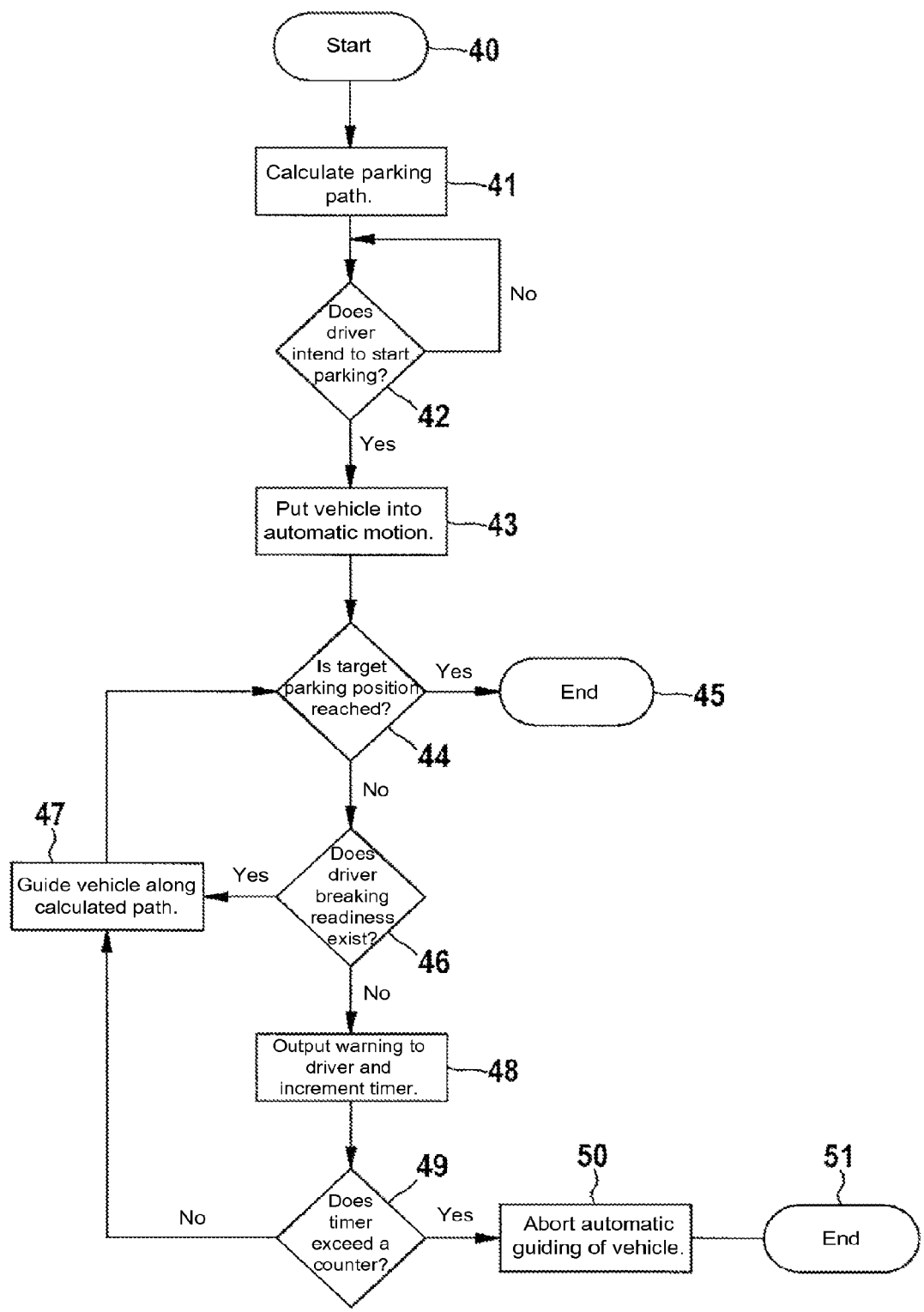
FIG. 4 shows an exemplary embodiment of a method sequence according to the present invention.

An exemplary embodiment of a method sequence according to the present invention is shown in FIG. 4. An automatic parking method is initiated starting from an initialization step

40. In a subsequent calculation step 41, computing unit 6 calculates a parking path from the instantaneous position of the vehicle into the parking space. In a subsequent first check step 42, it is queried whether the driver intends a start of a parking method. The beginning of the parking method may be triggered, for example, via an operation of an operating element provided for this purpose, such as the gas pedal of the vehicle or a separate pushbutton. If the driver has not yet started the parking method, the sequence branches back to first check step 42. Otherwise, the sequence branches to a start step 43, which puts the vehicle automatically into motion. In a subsequent second check step 44, it is checked whether the target parking position has already been reached. If so, the sequence branches to an end step 45 and the parking method is terminated. If the target parking position has not yet been reached, the sequence branches further to a third check step 46. In third check step 46, it is checked whether a braking readiness of the driver exists. For this purpose, for example, it is checked whether the brake pedal is touched. Alternatively or additionally, it may also be checked whether a foot of the driver is located above the brake pedal. If a braking readiness of the driver is detected, the sequence branches further to guiding step 47 and the vehicle is guided along the pre-calculated driving path to the target parking position. From guiding step 47, the sequence branches back to second check step 44. In contrast, if it is established in third check step 46 that a braking readiness of the driver cannot be detected, the sequence branches to a warning step 48. In warning step 48 an acoustic and/or visual warning is output to the driver. Furthermore, a timer is incremented. Subsequently, the sequence branches to a fourth check step 49. In fourth check step 49, it is checked whether the timer incremented in warning step 48 exceeds a counter. If not, the sequence first branches to guiding step 47 and the guiding of the vehicle is continued for the time being. However, if the counter is exceeded in the timer in fourth check step 49, a braking readiness of the driver has by now not yet been detected for more than a predefined time period. Therefore, the sequence branches to an abort step 50, in which automatic guiding of the vehicle is aborted or at least interrupted. In one specific embodiment, a driver is additionally acoustically and/or visually informed that automatic guiding of the vehicle does not take place any longer. In one further specific embodiment, automatic braking of the vehicle may also be induced in abort step 50. Subsequently, the method is terminated in an end step 51.

What is claimed is:

1. A control system for automatically guiding a vehicle during a parking procedure, comprising:
    a monitoring unit configured to monitor a brake pedal or its spatial area of the vehicle to ascertain a braking readiness of the driver of the vehicle, and to determine if the brake pedal is depressed, wherein the braking readiness is characterized by the brake pedal of the vehicle contacted but not depressed by a foot of the driver, or the foot of the driver being located in a predefined spatial area near the brake pedal but not depressing the brake pedal; and
    a main control unit having an interface to the monitoring unit and controlling the automatic parking procedure guiding of the vehicle based on a surrounding detection unit output and guidance control, wherein the automatic guiding of the vehicle is interrupted if the braking readiness of a driver is not detected by the monitoring unit, and also interrupted if the brake pedal is depressed.

2. The control system as recited in claim 1, wherein the main control unit further includes an interface to a deceleration unit of the vehicle to provide automatic deceleration of the vehicle in the event of an interruption of automatic guiding of the vehicle.

3. The control system as recited in claim 1, further comprising: a time measuring unit configured to measure a time period for which the braking readiness of the driver is not detected; wherein the interruption of the automatic guiding of the vehicle not initiated until the measured time period exceeds a predefined minimum time period.

4. The control system as recited in claim 1, wherein the main control unit further includes an interface to a warning unit to output a warning in the case the braking readiness of the driver is not detected.

5. A parking system for a vehicle, comprising:
    a surroundings detection unit for ascertaining a parking space;
    a path measuring device for determining a position of the vehicle in relation to the parking space;
    a monitoring unit configured to monitor a brake pedal or its spatial area of the vehicle to ascertain a braking readiness of the driver of the vehicle and to determine if the brake pedal is depressed, wherein the braking readiness is detected when one of (i) the brake pedal of the vehicle is contacted but not depressed by a foot of the driver, or (ii) the foot of the driver is located in a predefined spatial area near the brake pedal but not depressing the brake pedal; and
    a control unit having an interface to the surrounding detection unit, the path measuring device, and the monitoring unit and providing automatic guidance of the vehicle during a parking procedure, wherein the automatic guidance of the vehicle is interrupted if the braking readiness of a driver is not detected by the monitoring unit, and also interrupted if the brake pedal is depressed.

6. A method for automatically guiding a vehicle during a parking procedure, comprising:
    providing automatic vehicle parking procedure guidance using a main control unit based on a surrounding detection unit and guidance control;
    monitoring a brake operating unit of the vehicle to ascertain a braking readiness of the driver, wherein the braking readiness is detected when one of (i) the brake pedal of the vehicle is contacted but not depressed by a foot of the driver, or (ii) the foot of the driver is located in a predefined spatial area near the brake pedal but not depressing the brake pedal; and
    interrupting the automatic guiding of the vehicle if the braking readiness of the driver is not detected, and also if the brake pedal is depressed.

7. The method as recited in claim 6, further comprising:
    checking, at the beginning of the automatic guiding of the vehicle, the operation of a monitoring unit for monitoring the braking readiness of the driver; and
    outputting a warning in the case of a malfunction of the monitoring unit for monitoring the braking readiness of the driver.

8. The method as recited in claim 7, wherein the ascertainment of the braking readiness of the driver begins a predefined time period after the beginning of the automatic guiding of the vehicle.

9. The method as recited in claim 6, wherein the braking readiness is detected when the foot of the driver is located in the predefined spatial area near the brake pedal.

10. The control system of claim 1, wherein the monitoring unit includes a sensor to detect a pressure applied by the foot of the driver to the brake pedal.

11. The control system of claim 1, wherein the monitoring unit includes a capacitive sensor to detect a proximity of the foot of the driver to the brake pedal.

12. The control system of claim 1, wherein the monitoring unit includes an optical sensor to detect a distance between the optical sensor and the brake pedal or an object between the optical sensor and the brake pedal.

13. The control system of claim 1, wherein the monitoring unit includes at least one of an optical transmitter or an optical receiver positioned above the brake pedal, and the other of the optical transmitter or optical receiver located on the brake pedal, to detect when the foot of the driver is located in the predefined spatial area near the brake pedal.

14. The control system of claim 1, wherein the monitoring unit includes a video sensor unit to record and analyze an image of the brake pedal and any object in the predefined spatial area near the brake pedal, to detect when the foot of the driver is located in the predefined spatial.

15. The parking system as recited in claim 5, wherein the braking readiness is detected when the foot of the driver is located in a predefined spatial area near the brake pedal.

* * * * *